US007549223B2

(12) United States Patent
Mita

(10) Patent No.: US 7,549,223 B2

(45) Date of Patent: Jun. 23, 2009

(54) METHOD FOR MANUFACTURING A LIQUID EJECTION HEAD

(75) Inventor: Tsuyoshi Mita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 442 days.

(21) Appl. No.: 11/235,143

(22) Filed: Sep. 27, 2005

(65) Prior Publication Data

US 2006/0066686 A1 Mar. 30, 2006

(30) Foreign Application Priority Data

Sep. 28, 2004 (JP) ............................ 2004-282646

(51) Int. Cl.
*B23P 17/00* (2006.01)

(52) U.S. Cl. .................. 29/890.1; 29/25.35; 29/890.09; 347/68; 216/27

(58) Field of Classification Search ................ 29/890.1, 29/25.35, 830, 831, 832, 846, 850, 890.09; 347/54, 68–70; 216/27, 79
See application file for complete search history.

(56) References Cited

U.S. PATENT DOCUMENTS

| | | | | |
|---|---|---|---|---|
| 5,534,900 | A * | 7/1996 | Ohno et al. | 347/54 |
| 5,754,205 | A * | 5/1998 | Miyata et al. | 347/70 |
| 5,940,099 | A | 8/1999 | Karlinski | |
| 6,019,458 | A * | 2/2000 | Shimada et al. | 347/70 |
| 6,226,279 | B1 * | 5/2001 | Hansson et al. | 370/329 |
| 6,371,598 | B1 * | 4/2002 | Fujii et al. | 347/54 |
| 6,439,702 | B1 | 8/2002 | Karlinski | |
| 6,481,074 | B1 | 11/2002 | Karlinski | |
| 6,616,270 | B1 | 9/2003 | Miyata et al. | |
| 6,766,567 | B2 | 7/2004 | Karlinski | |
| 2003/0088969 | A1 | 5/2003 | Karlinski | |
| 2003/0206218 | A1 | 11/2003 | Miyata et al. | |

FOREIGN PATENT DOCUMENTS

| | | | |
|---|---|---|---|
| JP | 9-226114 | A | 9/1997 |
| JP | 2000-127379 | A | 5/2000 |
| JP | 2000-289201 | A | 10/2000 |
| JP | 2001-179973 | A | 7/2001 |
| JP | 2003-512211 | A | 4/2003 |
| WO | WO-01/30577 | A1 | 5/2001 |

* cited by examiner

*Primary Examiner*—Minh Trinh
*Assistant Examiner*—Tai Nguyen
(74) *Attorney, Agent, or Firm*—Birch, Stewart, Kolasch & Birch, LLP

(57) ABSTRACT

The method for manufacturing a liquid ejection head comprising a diaphragm which serves as portions of pressure chambers connected to nozzles through which liquid is ejected, and piezoelectric bodies which deform the diaphragm, the method comprises: an electrical wire forming step of removing at least a part of a silicon substrate, and forming electrical wires for supplying drive signals to drive the piezoelectric bodies, in sections where the silicon substrate has been removed; a piezoelectric body forming step of forming the piezoelectric bodies on sections where the silicon substrate has not been removed at least in the electrical wire forming step; and a diaphragm forming step of forming the diaphragm on a side of the piezoelectric bodies opposite to the silicon substrate.

6 Claims, 8 Drawing Sheets

METHOD FOR MANUFACTURING A LIQUID EJECTION HEAD

BACKGROUND OF THE INVENTION

1. Field of the Invention

The present invention relates to the field of an image forming apparatus comprising a liquid ejection head, and more particularly, to a liquid ejection head, a method of manufacturing the same and an image forming apparatus comprising the same in which ejection ports which eject liquid are arranged at a high density, and liquid flow channels are simplified.

2. Description of the Related Art

Conventionally, as an image forming apparatus, an inkjet printer (inkjet recording apparatus) is known, which comprises an inkjet head (liquid ejection head) having an arrangement of a plurality of nozzles (ejection ports) and which records images on a recording medium by ejecting ink from the nozzles toward the recording medium while causing the inkjet head and the recording medium to move relatively to each other.

In an inkjet printer of this kind, ink is supplied to pressure chambers from an ink tank, via an ink supply channel, and by driving piezoelectric elements by supplying electrical signals corresponding to the image data to the piezoelectric elements, the diaphragms constituting a portion of each pressure chamber are caused to deform, thereby reducing the volume of the pressure chamber and causing the ink inside the pressure chamber to be ejected from a nozzle in the form of a droplet.

In an inkjet recording printer, one image is formed on a recording medium by combining dots formed by ink ejected from the nozzles. In recent years, it has become desirable to form images of high quality on a par with photographic prints, in inkjet printers. It has been thought that high image quality can be achieved by reducing the size of the ink droplets ejected from the nozzles by reducing the diameter of the nozzles, while also increasing the number of pixels per image by arranging the nozzles at high density.

In order to achieve high density of the nozzles, it is indispensable to devise the composition of the electrical wiring and the ink flow channels suitably. Therefore, conventionally, there have been various proposals for achieving high density of the nozzle arrangement, as well as improving the ink supply efficiency and increasing the printing speed.

For example, it is known that high density of the nozzles can be achieved by providing ink supply channels for supplying ink to the pressure chambers in a diaphragm forming one surface of the pressure chambers, and also forming a reservoir (common liquid chamber) on the rear surface of the diaphragm in such a manner that ink is supplied to the pressure chambers from the reservoir by means of the ink supply channels (see, for example, Japanese Patent Application Publication No. 9-226114).

Furthermore, for example, it is also known that the structure can be simplified by providing piezoelectric elements on the surfaces of the pressure chambers opposite to the surfaces on which nozzles are provided, providing a portion of a reservoir for supplying ink on the side adjacent to the piezoelectric elements, and providing a covering on the piezoelectric elements, in such a manner that electrodes can be extracted by wire bonding, thin film formation, or the like (see, for example, Japanese Patent Application Publication No. 2000-127379).

Furthermore, for example, it is also known that higher density and lower costs can be achieved by disposing piezoelectric actuators on pressure chambers, on the nozzle surfaces thereof, adopting a structure in which aluminum plugs pass through laminated layers, and then performing silicon photoetching to form an inkjet head (see, for example, Japanese Patent Application Publication No. 2000-289201).

Moreover, for example, it is also known that an increased number of nozzles, reduced costs and high accuracy can be achieved, by providing supply restrictors in a diaphragm, providing an ink supply tank forming an ink supply section on the opposite side of piezoelectric elements from the pressure chambers, forming ink supply ports connecting to the pressure chambers from the ink supply tank and passing through the diaphragm, and furthermore, causing the ink supply section to act as an insulating sealing cover for the piezoelectric elements, and thus providing covering and damping functions for the piezoelectric elements (see, for example, Japanese Patent Application Publication No. 2001-179973).

Furthermore, for example, it is also known that by using a porous material having a large number of small internally connected pores, such as a sintered stainless steel member, in the ink supply layer, then passage of ink through same becomes possible, refilling properties are improved, high printing speed and high reliability are achieved, and an inkjet head having excellent ink preparation characteristics and filtering characteristics for a plurality of types of ink is obtained (see, for example, Japanese Patent Application Publication No. 2003-512211).

However, for example, in the devices described in Japanese Patent Application Publication Nos. 9-226114, 2000-127379 and 2001-179973, if a common flow channel (common liquid chamber) or a portion thereof is formed on the opposite side of a piezoelectric body from the diaphragm and the pressure chamber, then in order to achieve higher density and a higher ejection driving speed (higher driving frequency), since only the pressure chamber and the nozzle are disposed on the pressure chamber side due to the available space on the pressure chamber side, a supply channel (supply port) must be formed in the diaphragm and the common flow channel must pass completely through the diaphragm to the other surface (on the side opposite to the pressure chamber). Furthermore, the electrical wires, and the like, for supplying drive signals to the piezoelectric bodies, must be wired at high density. However, in this case, if the electrical wires are extracted on the same surface as the piezoelectric bodies, then a multi-layer flexible cable is required, which presents a large problem in terms of installation technology.

Furthermore, in the device described in Japanese Patent Application Publication No. 9-226114, actuators (piezo elements) are arranged at 1440 dpi in one row, but there is no description relating to the wiring, and hence the disclosure is not especially practical and even higher density is difficult to achieve.

Furthermore, in the device described in Japanese Patent Application Publication No. 2000-127379, a portion of the common liquid chamber (reservoir) is provided on the side adjacent to the piezoelectric elements, but since a portion of the common liquid chamber is naturally situated on the side adjacent to the pressure chambers, and since the common liquid chamber is also provided further toward the outer side of the piezoelectric elements than the electrical wiring surface, then it is not suitable for high density.

Furthermore, in the device described in Japanese Patent Application Publication No. 2000-289201, there is a piezoelectric actuator on the nozzle side, and a common liquid chamber is provided on the piezoelectric actuator side (and hence the nozzle side) in such a manner that a unified IC is formed, in addition to which, electrical wires (aluminum plugs) are formed perpendicularly from the drive circuits.

However, since the common liquid chamber is formed on the outer side of the piezoelectric actuators, and the aluminum plugs are formed so as to pass through the laminated layers in positions separate from the piezoelectric actuators and the common liquid chamber, then space for forming the plugs is required, and hence high density is difficult to achieve.

Moreover, in the device described in Japanese Patent Application Publication No. 2001-179973, pores for supplying ink are provided in the regions of a diaphragm made of zirconia where no piezoelectric elements are situated, but since the wiring is situated on the piezoelectric element surface, then whatever the shape of the elements, it is particularly difficult to apply to a matrix structure and high density is difficult to achieve.

Furthermore, in the device described in Japanese Patent Application Publication No. 2003-512211, bumps are formed on both surfaces of an insulating plate, in such a manner that the piezoelectric elements are pressurized by elastic pads and electrodes are extracted, but high density is difficult to achieve, and the connections are also liable to become instable.

SUMMARY OF THE INVENTION

The present invention has been contrived in view of the foregoing circumstances, an object thereof being to provide a liquid ejection head, a method of manufacturing same and an image forming apparatus comprising same, whereby high density and high speed driving can be achieved, while harmonizing the manufacturing processes for piezoelectric bodies and column-shaped electrical wires perpendicular to these bodies, facilitating bonding with the pressure chamber members, and ensuring the sealing properties of the column-shaped electrical wires and the piezoelectric bodies with respect to liquid.

In order to attain the aforementioned object, the present invention is directed to a method for manufacturing a liquid ejection head comprising a diaphragm which serves as portions of pressure chambers connected to nozzles through which liquid is ejected, and piezoelectric bodies which deform the diaphragm, the method comprising: an electrical wire forming step of removing at least a part of a silicon substrate, and forming electrical wires for supplying drive signals to drive the piezoelectric bodies, in sections where the silicon substrate has been removed; a piezoelectric body forming step of forming the piezoelectric bodies on sections where the silicon substrate has not been removed at least in the electrical wire forming step; and a diaphragm forming step of forming the diaphragm on a side of the piezoelectric bodies opposite to the silicon substrate.

Accordingly, it is possible to form the electrical wires (electrical columns), the piezoelectric bodies and the diaphragm as a unified structure on the same substrate, and therefore, positional divergence between the respective constituent elements during manufacture can be reduced.

Preferably, the method further comprises a pressure chamber bonding step of bonding a separately formed nozzle plate including the pressure chambers and the nozzles, onto the silicon substrate on which the electrical wires, the piezoelectric bodies and the diaphragm have been formed respectively in the electrical wire forming step, the piezoelectric body forming step and the diaphragm forming step.

Accordingly, handling of the respective members during manufacture is facilitated, and pressure can be applied during bonding of the pressure chambers onto the substrate formed with piezoelectric bodies.

Preferably, the method further comprises: a common liquid chamber forming step of, after the pressure chamber bonding step, removing the silicon substrate between the electrical wires while leaving silicon covering outer circumferences of the electrical wires, to form opening sections serving as a common liquid chamber which supplies the liquid to the pressure chambers, wherein the electrical wires are formed perpendicularly to the silicon substrate in the electrical wire forming step.

Accordingly, the outer circumferences of the electrical wires have silicon surfaces, and therefore the electrical wires can be shielded (insulated) from ink.

Preferably, the removing of the silicon substrate in the common liquid chamber forming step is performed by means of at least one of anisotropic etching and dry etching.

Accordingly, it is possible to carry out processing following the electrical wires which are substantially perpendicular to the surface of the silicon substrate, and it is also possible to form the common liquid chamber to a high degree of accuracy.

Preferably, the method further comprises a heat treatment step of, after the piezoelectric body forming step and before the diaphragm forming step, performing heat treatment for the piezoelectric bodies.

Accordingly, heat with a temperature of 500° C. to 600° C. required for the heat treatment is not applied to the diaphragm, and therefore there is no thermal warping of the diaphragm.

Preferably, the method further comprises a polarization step of, after the diaphragm forming step, polarizing the piezoelectric bodies by using the electrical wires and the diaphragm.

Accordingly, it is possible to polarize the piezoelectric bodies jointly, and therefore, work efficiency is improved.

Preferably, in the electrical wire forming step, the removing of the silicon substrate is performed by means of at least one of anisotropic etching and dry etching, and the forming of the electrical wires is performed by plating.

Accordingly, it is possible to process holes with good accuracy, and electrodes of high aspect can be formed at relatively low cost.

In order to attain the aforementioned object, the present invention is also directed to a liquid ejection head, comprising: nozzles through which liquid is ejected; pressure chambers which are respectively connected to the nozzles; a diaphragm which serves as portions of the pressure chambers; piezoelectric bodies which are disposed on the diaphragm and deform the diaphragm; a common liquid chamber which supplies the liquid to the pressure chambers, the common liquid chamber being formed on a side of the piezoelectric bodies opposite to the pressure chambers; electrical wires which supply drive signals for driving the piezoelectric bodies, the electrical wires being erected inside the common liquid chamber perpendicularly with respect to the piezoelectric bodies; and a silicon coating which covers outer circumferences of the electrical wires.

Accordingly, since the space for the common liquid chamber can be reduced on the pressure chamber side, it is possible to increase the density of the nozzles, and since the wires are extracted in a two-dimensional fashion, narrow pitch arrangement of the wiring becomes unnecessary.

Preferably, the liquid ejection head further comprises silicon columns which are erected inside the common liquid chamber perpendicularly with respect to the piezoelectric bodies, separately from the electrical wires.

Accordingly, it is possible to improve the mechanical strength of the liquid ejection head.

In order to attain the aforementioned object, the present invention is also directed to an image forming apparatus comprising the above-described liquid ejection head.

Accordingly, it is possible to form high-quality images using a liquid ejection head formed to a high density.

As described above, according to the liquid ejection head, the method of manufacturing same, and the image forming apparatus comprising same relating to the present invention, both piezoelectric bodies and column-shaped electrical wires (electrical columns) are formed on the same silicon substrate, and therefore, it is possible to harmonize the manufacturing processes for the piezoelectric bodies and the column-shaped electrical wires (electrical columns) formed perpendicularly to these bodies, and hence positional divergence arising during manufacture can be reduced. Moreover, when pressure chambers are to be bonded to a substrate formed with these piezoelectric bodies and electrical wires, then it is possible to bond the pressure chambers in the form of a substrate, thus facilitating the process of bonding with the pressure chamber member and ensuring rigidity during the bonding operation.

Furthermore, when the piezoelectric bodies are polarized in a process after forming the diaphragm, it is possible to polarize all of the piezoelectric bodies together, in the same process. Furthermore, when coating the outer circumferences of the electrical wires with silicon, it is possible to ensure the sealing of the electrical wires with respect to the liquid.

By manufacturing a liquid ejection head by means of the steps described above, it is possible to achieve high density and high-speed driving.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
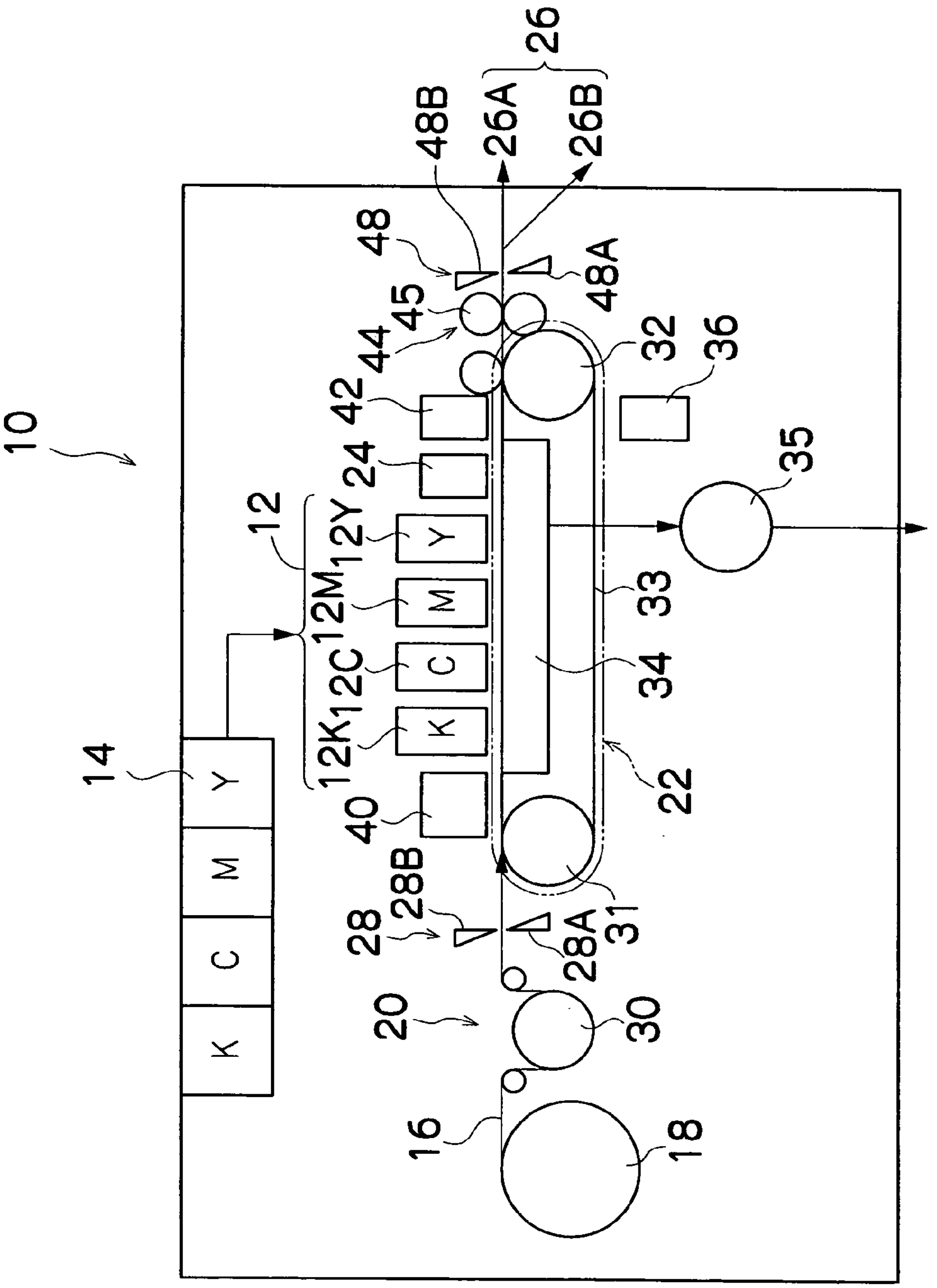
FIG. 1 is a general schematic drawing of one embodiment of an inkjet recording apparatus forming an image forming apparatus according to the present invention.

FIG. 1 is a general schematic drawing showing an approximate view of one embodiment of an inkjet recording apparatus forming an image forming apparatus having a liquid ejection head relating to the present invention.

As shown in FIG. 1, the inkjet recording apparatus 10 comprises: a printing unit 12 having a plurality of print heads (liquid ejection heads) 12K, 12C, 12M, and 12Y for ink colors of black (K), cyan (C), magenta (M), and yellow (Y), respectively; an ink storing and loading unit 14 for storing inks of K, C, M and Y to be supplied to the print heads 12K, 12C, 12M, and 12Y; a paper supply unit 18 for supplying recording paper 16; a decurling unit 20 for removing curl in the recording paper 16 supplied from the paper supply unit 18; a suction belt conveyance unit 22 disposed facing the nozzle face (ink droplet ejection face) of the print unit 12, for conveying the recording paper 16 while keeping the recording paper 16 flat; a print determination unit 24 for reading the printed result produced by the printing unit 12; and a paper output unit 26 for outputting printed recording paper (printed matter) to the exterior.

In FIG. 1, a magazine for rolled paper (continuous paper) is shown as an example of the paper supply unit 18; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which roll paper is used, a cutter 28 is provided as shown in FIG. 1, and the roll paper is cut to a desired size by the cutter 28. The cutter 28 has a stationary blade 28A, whose length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyance path. When cut paper is used, the cutter 28 is not required.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1. The suction chamber 34 provides suction with a fan 35 to generate a negative pressure, and the recording paper 16 on the belt 33 is held by suction.

The belt 33 is driven in the clockwise direction in FIG. 1 by the motive force of a motor (not shown) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, or a combination of these. In the case of the configuration in which the belt 33 is nipped with the cleaning rollers, it is preferable to make the line velocity of the cleaning rollers different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
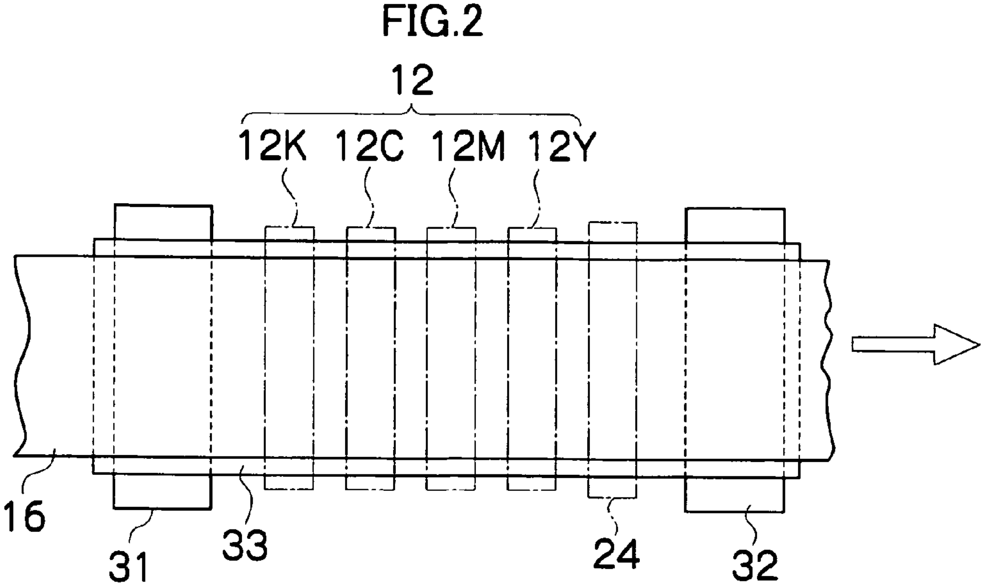
FIG. 2 is a plan view of the principal part of the peripheral area of a print unit in the inkjet recording apparatus illustrated in FIG. 1.

FIG. 2 is a principal plan diagram showing the periphery of the print unit 12 in the inkjet recording apparatus 10.

As shown in FIG. 2, the print unit 12 is a so-called "full line head" in which a line head having a length corresponding to the maximum paper width is arranged in a direction (main scanning direction) that is perpendicular to the paper conveyance direction (sub-scanning direction).

The print heads 12K, 12C, 12M and 12Y are constituted by line heads in which a plurality of ink ejection ports (nozzles) are arranged through a length exceeding at least one side of the maximum size recording paper 16 intended for use with the inkjet recording apparatus 10.

The print heads 12K, 12C, 12M, 12Y corresponding to respective ink colors are disposed in the order, black (K), cyan (C), magenta (M) and yellow (Y), from the upstream side (left-hand side in FIG. 1), following the direction of conveyance of the recording paper 16 (the paper conveyance direction). A color print can be formed on the recording paper 16 by ejecting the inks from the print heads 12K, 12C, 12M, and 12Y, respectively, onto the recording paper 16 while conveying the recording paper 16.

The print unit 12, in which the full-line heads covering the entire width of the paper are thus provided for the respective ink colors, can record an image over the entire surface of the recording paper 16 by performing the action of moving the recording paper 16 and the print unit 12 relatively to each other in the paper conveyance direction (sub-scanning direction) just once (in other words, by means of a single subscan). Higher-speed printing is thereby made possible and productivity can be improved in comparison with a shuttle type head configuration in which a recording head moves reciprocally in a direction (main scanning direction) which is perpendicular to the paper conveyance direction (sub-scanning direction).

Here, the terms main scanning direction and sub-scanning direction are used in the following senses. More specifically, in a full-line head comprising rows of nozzles that have a length corresponding to the entire width of the recording paper, "main scanning" is defined as printing one line (a line formed of a row of dots, or a line formed of a plurality of rows of dots) in the breadthways direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other. The direction indicated by one line recorded by a main scanning action (the lengthwise direction of the band-shaped region thus recorded) is called the "main scanning direction".

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other. The direction in which sub-scanning is performed is called the sub-scanning direction. Consequently, the conveyance direction of the reference point is the sub-scanning direction and the direction perpendicular to same is called the main scanning direction.

Although the configuration with the KCMY four standard colors is described in the present embodiment, combinations of the ink colors and the number of colors are not limited to those. Light inks or dark inks can be added as required. For example, a configuration is possible in which print heads for ejecting light-colored inks such as light cyan and light magenta are added.

As shown in FIG. 1, the ink storing and loading unit 14 has tanks for storing inks of the colors corresponding to the respective print heads 12K, 12C, 12M and 12Y, and each tank is connected to a respective print head 12K, 12C, 12M, 12Y, via a tube channel (not illustrated). Moreover, the ink storing and loading unit 14 also comprises a notifying device (display device, alarm generating device, or the like) for generating a notification if the remaining amount of ink has become low, as well as having a mechanism for preventing incorrect loading of the wrong colored ink.

The print determination unit 24 has an image sensor (a line sensor or the like) for capturing an image of the ink-droplet deposition result of the printing unit 12, and functions as a device to check for ejection defects such as clogs of the nozzles in the printing unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern image printed by the print heads 12K, 12C, 12M, and 12Y for the respective colors, and determines the ejection of each head. The ejection determination includes the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown, the paper output unit 26A for the target prints is provided with a sorter for collecting prints according to print orders.

Figure 3:
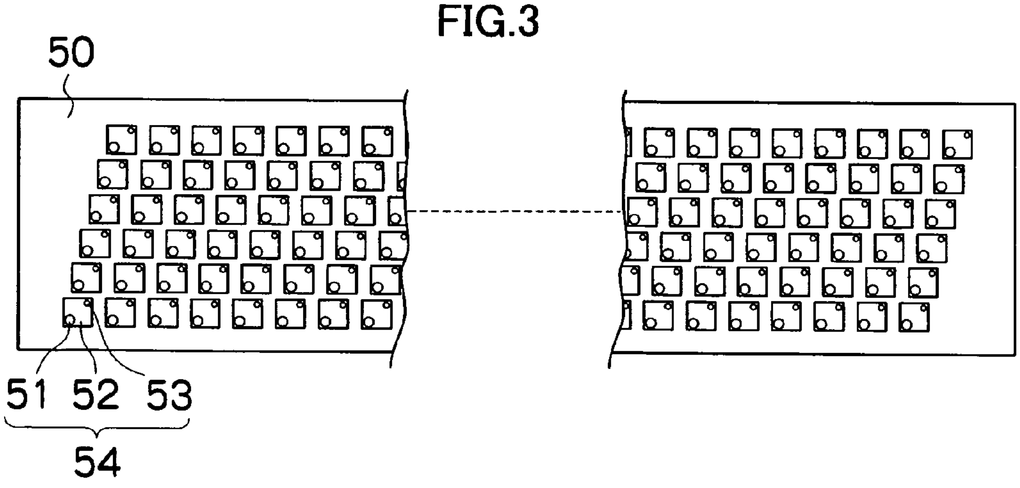
FIG. 3 is a plan perspective diagram showing an example of the structure of a print head.

Next, the arrangement of nozzles (liquid ejection ports) in the print head (liquid ejection head) will be described. The print heads 12K, 12C, 12M and 12Y provided for the respective ink colors each have the same structure, and a print head forming a representative example of these print heads is indicated by the reference numeral 50. FIG. 3 shows a plan view perspective diagram of the print head 50.

As shown in FIG. 3, the print head 50 according to the present embodiment achieves a high density arrangement of nozzles 51 by using a two-dimensional staggered matrix array of pressure chamber units 54, each constituted by a nozzle for ejecting ink as ink droplets, a pressure chamber 52 for applying pressure to the ink in order to eject ink, and an ink supply port 53 for supplying ink to the pressure chamber 52 from a common flow channel (not shown in FIG. 3).

There are no particular limitations on the size of the nozzle arrangement in a print head 50 of this kind, but as one example, 2400 npi ("nozzles per inch") can be achieved by arranging nozzles 51 in 48 lateral rows (21 mm) and 600 vertical columns (305 mm).

In the example shown in FIG. 3, the pressure chambers 52 each have an approximately square planar shape when viewed from above, but the planar shape of the pressure chambers 52 is not limited to a square shape. As shown in FIG. 3, a nozzle 51 is formed at one end of a diagonal of each pressure chamber 52, and an ink supply port 53 is provided at the other end thereof.

Figure 4:
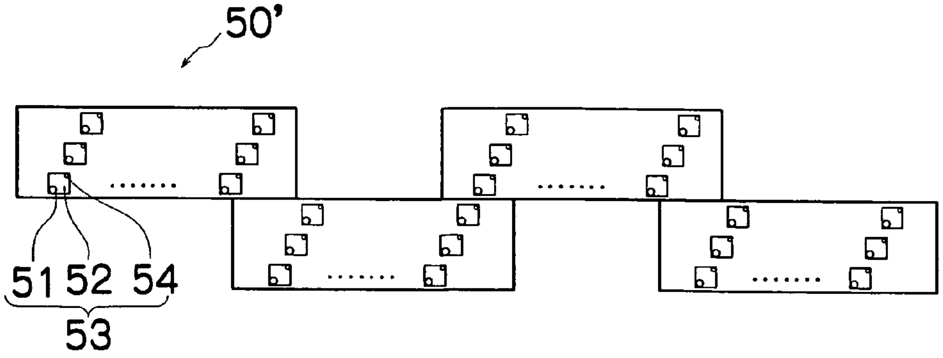
FIG. 4 is a plan view showing a further example of a print head.

Moreover, FIG. 4 is a plan view perspective diagram showing a further example of the structure of a print head. As shown in FIG. 4, one long full line head may be constituted by combining a plurality of short heads 50' arranged in a two-dimensional staggered array, in such a manner that the combined length of this plurality of short heads 50' corresponds to the full width of the print medium.

In the present embodiment, in order to achieve high density in a print head in this way, firstly, a high-density arrangement of nozzles 51 is obtained (for example, 2400 npi) by arranging pressure chambers 52 (nozzles 51) in the form of a two-dimensional matrix, as shown in FIG. 3 for example. Thereupon, as described in more detail below, in the present embodiment, the ink supply system is simplified and integrated to a high degree by disposing a large ink pool for supplying ink to the pressure chambers 52 above the diaphragm, and eliminating tubing which causes flow resistance, in such a manner that the ink is supplied directly from this common liquid chamber to the pressure chambers 52, thus prioritizing ink refilling characteristics. Furthermore, in the present embodiment, the piezoelectric element wires (electrical wires) which supply drive signals to the electrodes (individual electrodes) of the piezoelectric elements that deform the pressure chambers 52 rise upward vertically from each individual electrode and are connected to upper wiring, such as a multi-layer flexible cable, in such a manner that they pass through the common liquid chamber.

Figure 5:
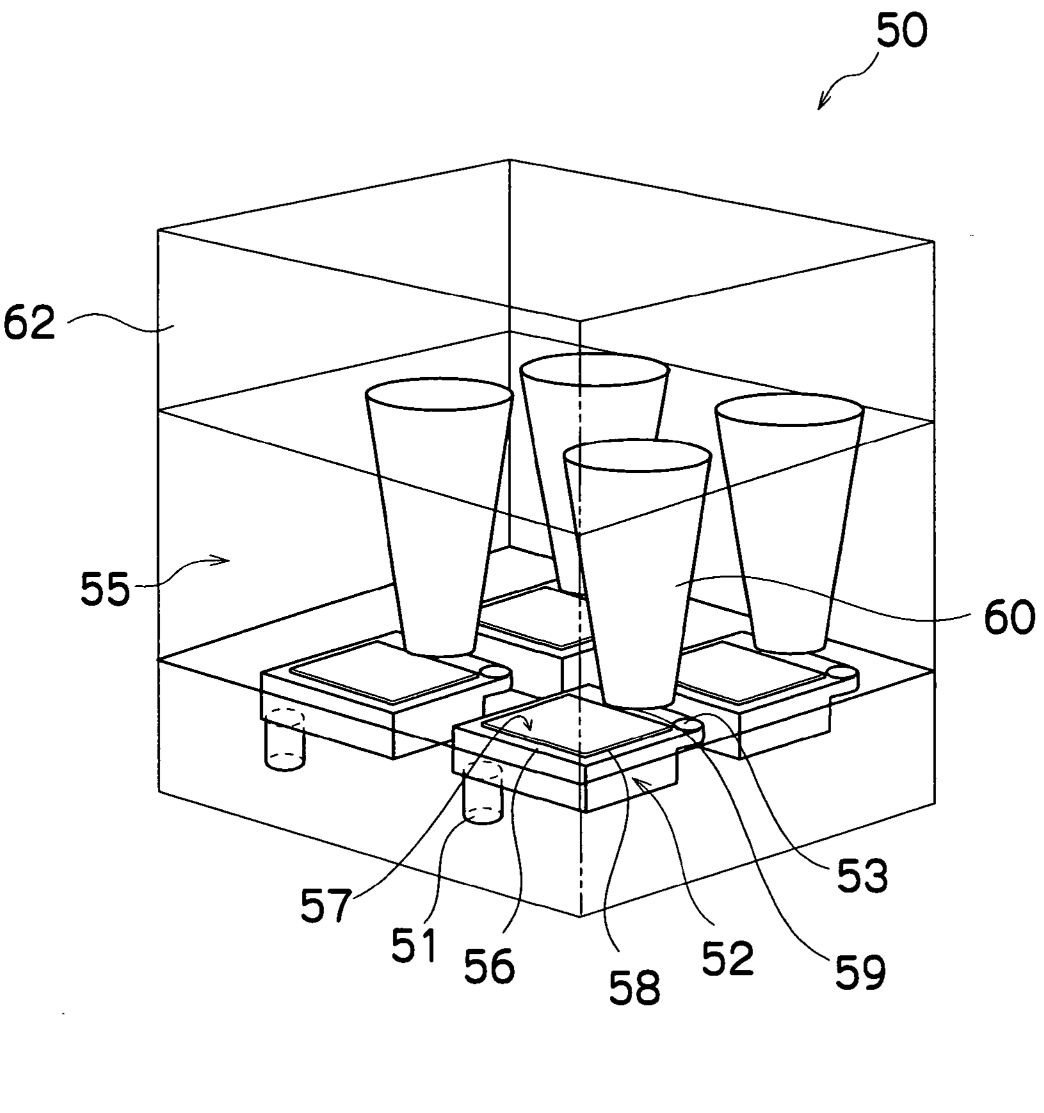
FIG. 5 is an oblique perspective diagram showing a partial enlarged view of the print head according to the present embodiment.

FIG. 5 shows a simplified oblique perspective view of one portion of a print head 50 according to the present embodiment formed to a high density in this way.

As shown in FIG. 5, in the print head 50 according to the present embodiment, a diaphragm 56 which forms the upper surface of pressure chambers 52 is disposed on the upper side of pressure chambers 52 each having a nozzle 51 and an ink supply port 53, and piezoelectric elements 58 (piezoelectric actuators) constituted by a piezoelectric body, such as a piezo element, sandwiched between upper and lower electrodes, are disposed in positions on the diaphragm 56 corresponding to the respective pressure chambers 52. An individual electrode 57 is provided on the upper surface of each piezoelectric element 58.

An electrode pad 59 forming an electrode connecting section is extracted to the outer side of the pressure chamber 52 from the end face of each individual electrode 57, and an electrical wire 60 is formed on this electrode pad 59 so as to rise up in a perpendicular direction. A multi-layer flexible cable 62 is provided above the electrical wires 60 which rise up in a substantially perpendicular direction, and drive signals are supplied from a head driver (not illustrated) to the individual electrodes 57 of the piezoelectric elements 58 via these wires.

Furthermore, the space in which the column-shaped electrical wires 60 are erected between the diaphragms 56 and the multiplayer flexible cable 62 is a single large common liquid chamber, and it forms a common liquid chamber 55 for supplying ink to the respective pressure chambers 52 via the respective ink supply ports 53.

The common liquid chamber 55 illustrated here is one large space formed throughout the whole region where the pressure chambers 52 are formed, in such a manner that it supplies ink to all of the pressure chambers 52 illustrated in FIG. 3, but the common liquid chamber 55 is not limited to being formed into one space, and a plurality of chambers may be formed by dividing up the space into several regions.

The electrical wire 60 which rises up perpendicularly like a column on top of the electrode pad 59 provided connecting to the individual electrode 57 at each pressure chamber 52 supports the multiplayer flexible cable 62 from below, thus creating a space which forms the common liquid chamber 55. In other words, the electrical wires 60 are formed so as to pass through the common liquid chamber 55.

The column-shaped electrical wires 60 shown here are formed independently with respect to the piezoelectric elements 58 (or the individual electrodes 57 thereof), in a one-to-one correspondence, but in order to reduce the number of wires (the number of electrical columns), it is also possible to make one column correspond to a plurality of piezoelectric elements 58, in such a manner that the electrical wires 60 corresponding to several piezoelectric elements 58 are gathered together and formed into a single column. Moreover, in addition to the wiring to the individual electrodes 57, the wiring to the common electrode (diaphragm 56) can also be formed in the shape of columns, similarly to the electrical wires 60 to the piezoelectric elements 58 in this way.

The nozzle 51 is formed in the bottom surface as illustrated in FIG. 5, and the ink supply port 53 is provided on the upper surface in a corner section which is symmetrical with respect to the nozzle 51. The ink supply port 53 is pierced through the diaphragm 56, and the upper-positioned common liquid chamber 55 and the pressure chamber 52 is connected by means of the ink supply port 53. Consequently, it is possible to form a direct fluid connection between the common liquid chamber 55 and each of the pressure chambers 52.

The diaphragm 56 is formed as a single plate, which is common to all of the pressure chambers 52. Piezoelectric elements 58 for deforming the pressure chambers 52 are disposed on the diaphragm 56 in positions corresponding to the respective pressure chambers 52. Electrodes (the common electrode and the individual electrode) for driving the piezoelectric elements 58 by applying a voltage to same are formed on the upper and lower surfaces of each piezoelectric element 58, thereby sandwiching the piezoelectric element 58.

The diaphragm 56 may be formed as a thin conductive film made of stainless steel, or the like, in such a manner that the diaphragm 56 may also serve as a common electrode. In this case, an individual electrode 57 for driving the piezoelectric element 58 independently is provided on the upper surface of each of the piezoelectric elements 58.

As described above, an electrode pad 59 is formed leading from each individual electrode 57, and an electrical wire 60 (electrical column) which passes through the common liquid chamber 55 is formed rising up perpendicularly from the electrode pad 59.

A multi-layer flexible cable 62 is formed on top of the column-shaped electrical wires 60, in such a manner that the multi-layer flexible cable 62 is supported by the pillars formed by the electrical wires 60, and the space forming the common liquid chamber 55 is created by taking the diaphragm 56 as the base, and the multi-layer flexible cable 62 as the ceiling. Furthermore, although not shown in the drawings, electrical wires 60 are connected respectively to the individual wires formed on the multi-layer flexible cable 62, and drive signals are supplied from these wires to the respective individual electrodes 57 via the electrical wires 60, in such a manner that each of the piezoelectric elements 58 can be driven independently.

Furthermore, although not shown in FIG. 5, the common liquid chamber 55 is filled with ink, the surfaces of the diaphragm forming the common electrode 56, the individual electrodes 57, the electrical wires 60 and the multi-layer flexible cable 62 are covered with an insulating protective film, otherwise they make contact with the ink.

There are no particular restrictions on the size of the print head 50 described above, but to give one example, the planar shape of the pressure chambers 52 is a square shape of 300 μm×300 μm, and the height of the pressure chambers is 150 μm, while the diaphragm 56 and the piezoelectric elements 58 each have a thickness of 10 μm, and the electrical wires 60 (electrical columns) have a diameter of 100 μm at the connecting section with the electrode pad 59, and a height of 500 μm, for instance.

Figure 6:
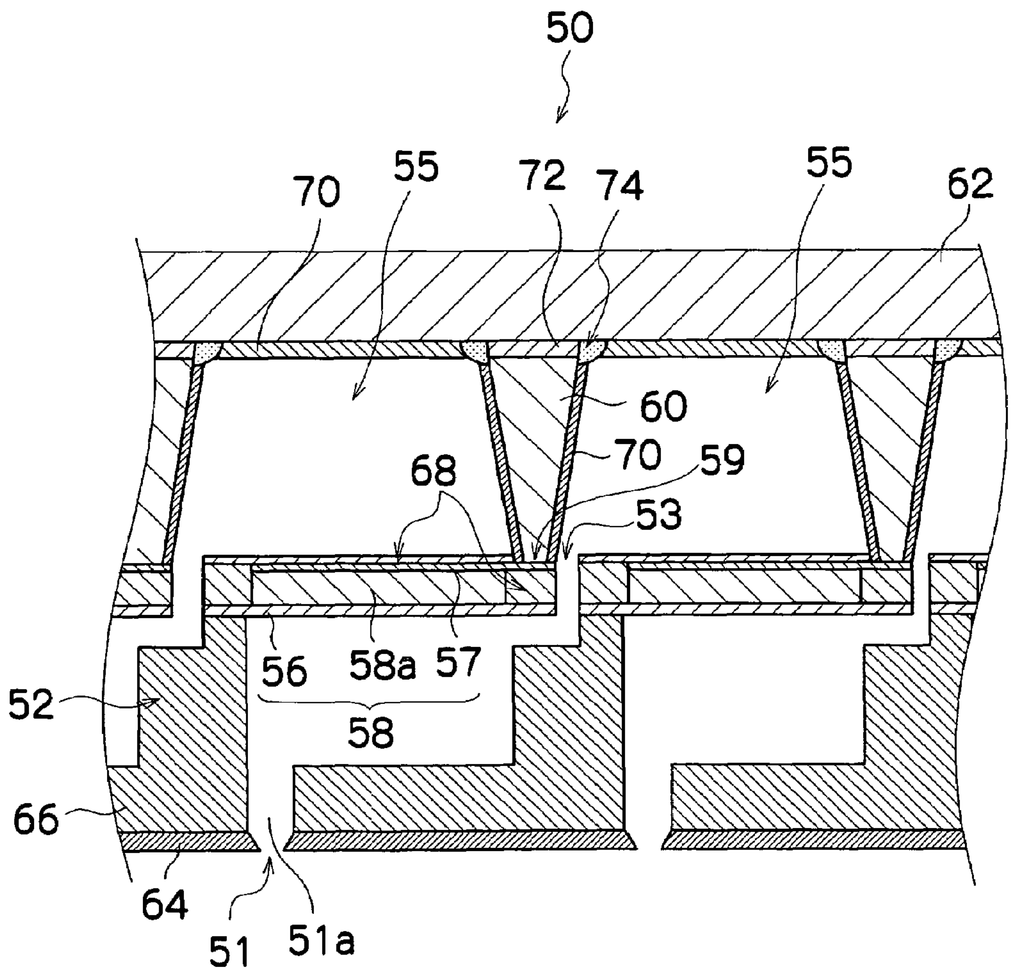
FIG. 6 is a cross-sectional diagram showing a partial enlarged view of the print head according to the present embodiment.

FIG. 6 is a cross-sectional diagram showing an enlarged view of one portion of a print head 50 according to the present embodiment.

As shown in FIG. 6, the print head 50 is formed by laminating together a plurality of thin plates, or the like. Firstly, a flow channel plate 66 formed with pressure chambers 52, ink supply ports 53 and the like, is layered onto a nozzle plate 64 formed with nozzles 51. In the diagram, the flow channel plate 66 is depicted as a single plate, but in practice, the flow channel plate 66 may also be formed by laminating together a plurality of plates.

The diaphragm 56 forming the ceiling faces of the pressure chambers 52 is laminated onto the flow channel plate 66. Desirably, the diaphragm 56 also serves as the common electrode for driving the piezoelectric elements 58, as described below in conjunction with the individual electrodes 57. Furthermore, opening sections corresponding to the ink supply ports 53 of the pressure chambers 52 are provided in the diaphragm 56, thereby providing direct connections between the pressure chambers 52 and the common liquid chamber 55 formed on the upper side of the diaphragm 56.

Piezoelectric bodies 58*a* are formed on the diaphragm 56 (which also serves as the common electrode) in regions respectively corresponding to approximately the whole upper surfaces of the pressure chambers 52, and an individual electrode 57 is formed on the upper surface of each of the piezoelectric bodies 58*a*. The piezoelectric body 58*a* sandwiched between a lower common electrode (diaphragm 56) and an upper individual electrode 57 in this way reduces the volume of the pressure chamber 52 by deforming when a voltage is applied via the common electrode (diaphragm 56) and the individual electrode 57, thereby constituting a piezoelectric element 58 (piezoelectric actuator) which causes ink to be ejected from the nozzle 51.

An electrode pad 59 forming an electrode connecting section is formed by extracting a wire to the outside from the end of the individual electrode 57 adjacent to the ink supply port 53. Thereupon, an electrical wire 60 (electrical column) rising up perpendicularly in a column shape is formed on top of the electrode pad 59 in such a manner that it passes through the common liquid chamber 55. An insulating layer 68 of polyimide (PI) or the like, is formed between the electrode pad 59 and the common electrode (diaphragm 56).

A multi-layer flexible cable 62 is formed on top of the electrical wires 60, and wires (not illustrated) formed in the multi-layer flexible cable 62 are connected to the respective electrical wires 60, in such a manner that drive signals for driving the piezoelectric elements 58 can be supplied via the respective electrical wires 60. Furthermore, the electrical wires 60 and the multi-layer flexible cable 62 are bonded at the electrode connecting sections 72 by means of an adhesive 74 containing an electrically conductive filler.

Moreover, the space in which the column-shaped electrical wires 60 (electrical columns) are erected between the diaphragm 56 and the multi-layer flexible cable 62 forms the common liquid chamber 55 in which ink to be supplied to the pressure chambers 52 is accumulated, and since this space is filled with ink, the surface portions of the diaphragm 56, the individual electrodes 57, the piezoelectric bodies 58*a*, the electrical wires 60 and the multi-layer flexible cable 62, which otherwise make contact with the ink, are covered with an insulating/protective film 70.

In this way, in the present embodiment, the common liquid chamber, which is conventionally situated on the same side of the diaphragm as the pressure chambers, is transferred to the upper side of the diaphragm, and hence is disposed on the opposite side to the pressure chambers. Therefore, in contrast to the prior art, no piping, or the like, is required to conduct the ink from the common liquid chamber to the pressure chambers, and furthermore, since the size of the common liquid chamber can be increased, the ink can be supplied reliably, and high nozzle density can be achieved, while also enabling driving at high frequency even when the nozzles are arranged at high density.

Furthermore, since the wirings to the individual electrodes of the respective piezoelectric elements rise up perpendicularly from the electrode pads of the individual electrodes, then it is possible to increase the density of the wirings used to supply drive signals to the piezoelectric elements.

Furthermore, since the common liquid chamber is positioned on the upper side of the diaphragm in such a manner that the common liquid chamber and pressure chambers are connected directly by means of the ink supply ports, it is possible to provide a direct fluid connection between the common liquid chamber and the pressure chambers, and moreover, since the common liquid chamber is positioned on the upper side of the diaphragm, it is possible to reduce the length of the nozzle flow channels 51*a* from the pressure chambers 52 to the nozzles 51, in comparison with the prior art, and even if the nozzles are formed to a high density, it is still possible to eject ink of high viscosity (for example, approximately 20 cP to 50 cP) and a flow channel structure capable of swift refilling after ejection is achieved.

Next, a method of manufacturing a print head 50 of this kind will be described.

FIGS. 7A to 7F show a process for manufacturing column-shaped electrical wires (electrical columns) 60; FIG. 8A to 8I show a process for manufacturing piezoelectric bodies and a diaphragm; and FIGS. 9A to 9G show a process for bonding pressure chambers with an IC substrate.

Firstly, the process for manufacturing the column-shaped electrical wires 60 is described with reference to FIGS. 7A to 7F.

Figure 7A:
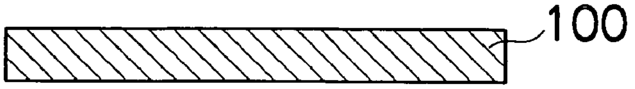
FIGS. 7A to 7F are process step diagrams showing a process for manufacturing column-shaped electrical wires (electrical columns) according to the present embodiment.

As shown in FIG. 7A, a silicon substrate 100 having the surface orientation (110) is prepared. Through holes are opened in the silicon substrate 100, and column-shaped electrical wires (electrical columns) 60 having a height of 0.5 mm are formed in these holes. Therefore, the silicon substrate 100 is prepared to a thickness of 0.5 mm.

Figure 7B:
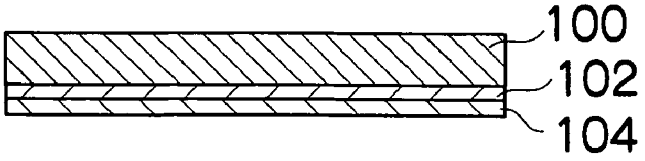

Next, as shown in FIG. 7B, a conductive film 102 of gold, or the like, is applied by sputtering to the lower surface (in FIG. 7B) of the silicon substrate 100, and furthermore, a $SiO_2$ film 104 is applied by sputtering below this conductive film. Here, the application of the conductive film 102 serves to provide a seed for plating growth when a plating is grown at a subsequent stage in order to form column-shaped electrical wires 60, and it also serves to form an electrode for batch poling, when the piezoelectric bodies are poled.

Figure 7C:
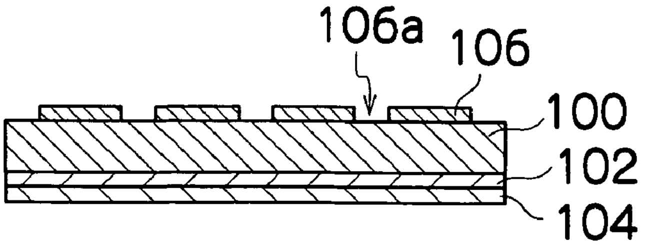

Next, as shown in FIG. 7C, an $SiO_2$ film 106 is applied by sputtering to the opposite side of the silicon substrate 100 (the upper surface in FIG. 7C), and sections 106*a* which are to form through holes for creating the electrical wires 60 are formed by means of photolithography using a mask. The diameter of the sections 106*a* which are to form the through holes is approximately 100 μm.

Figure 7D:
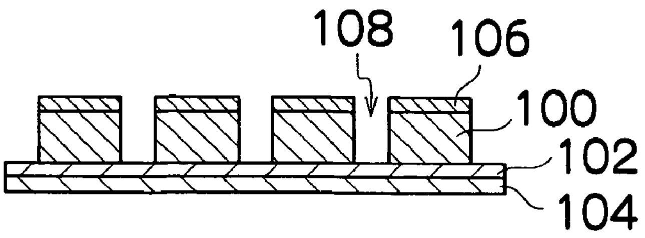

Thereupon, as shown in FIG. 7D, through holes 108 for creating the electrical wires 60 are formed by piercing through the 0.5 mm (500 μm) thickness of the silicon substrate 100, up to the surface of the conductive film 102, by means of anisotropic etching of the (110) surface or dry reactive ion etching (D-RIE) using photoresist.

Figure 7E:
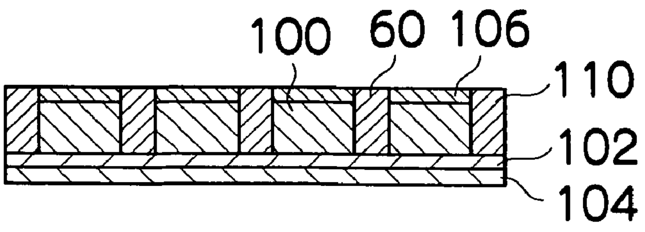

Next, as shown in FIG. 7E, using the conductive film 102 forming a metal electrode as a seed, wiring sections 110 of the electrical wires 60 are formed by plating Cu, Cr, or the like in the through holes 108 for creating the electrical wires 60 which have been opened up until the gold conductive film 102.

Figure 7F:
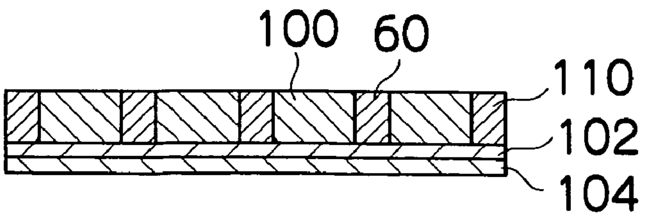

Finally, as shown in FIG. 7F, the $SiO_2$ film 106 forming the upper surface resist film is stripped away, and the surface is ground in such a manner that the upper face becomes flat.

Next, a process for subsequently manufacturing PZT (piezo elements) and a diaphragm will be described with reference to FIGS. 8A to 8I.

Figure 8A:
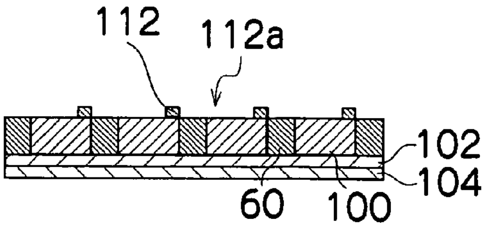
FIGS. 8A to 8I are process step diagrams showing a process for manufacturing piezoelectric bodies and a diaphragm.

Firstly, as shown in FIG. 8A, the silicon substrate 100 manufactured by the electrical wiring manufacturing process described above, in which sections for creating electrical wires 60 have been formed, is taken and resist is applied onto same, and the resist is processed by photolithography to create a mask 112 which forms empty sections 112*a* for creating individual electrodes 57 in the next processing stage.

Figure 8B:
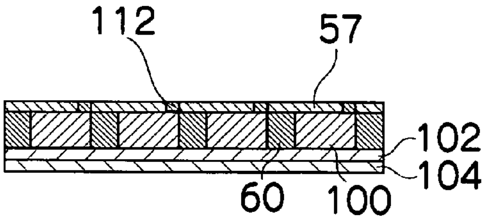

Next, as shown in FIG. 8B, platinum is applied by sputtering to the empty sections 112*a* for creating individual electrodes 57 formed by the resist mask 112, and thereby individual electrodes 57 for making an electrical connection with the electrical wires 60 are formed.

Figure 8C:
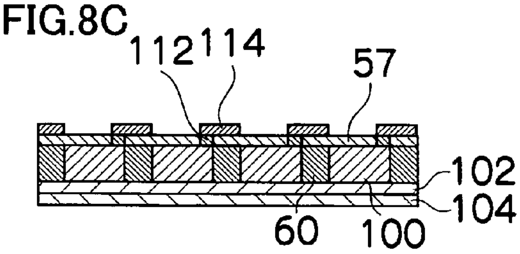

Thereupon, as shown in FIG. 8C, a mask 114 is applied as a pattern for forming piezoelectric bodies (PZT), onto the flat sections created by forming the individual electrodes 57 in the empty sections 112*a* of the resist mask 112.

Figure 8D:
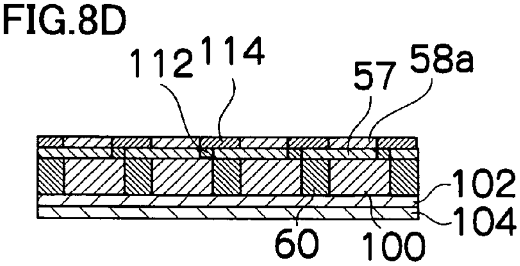

Next, as shown in FIG. 8D, using the mask 114 for forming piezoelectric bodies, piezo (PZT) films are formed to a thickness of approximately 10 μm, for example, by aerosol deposition (AD) or sputtering, thereby forming piezoelectric bodies 58*a*.

Figure 8E:
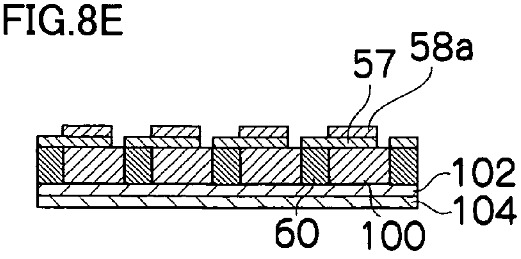

Thereupon, as shown in FIG. 8E, the mask 114 for forming piezoelectric bodies, which is now redundant, is stripped away and calcination is performed in order to crystallize the piezoelectric bodies 58*a*. In this case, crystallization is carried out by means of an energy-assist technique using a plasma laser, or the like, depending on the crystalline properties of the PZT. Furthermore, since the formation of the piezoelectric bodies involves heat treatment at a temperature of 600° C. to 800° C., then desirably, taking account of the difference of the silicon substrate 100 and the electrical wires 60 in the thermal expansivity, and the heat resistance properties of the material forming the electrical wires 60, a metal having a high melting point and a proximate coefficient of thermal expansion is used for the metal wiring 60.

More specifically, whereas the coefficient of thermal expansion of silicon (Si) is $2.8\times10^{-6}$/° C., that of chromium (Cr) is $4.9\times10^{-6}$/° C., that of tungsten (W) is $4.5\times10^{-6}$/° C., and that of Invar, which is a Fe/Ni alloy, is $2\times10^{-6}$/° C. or less. Therefore, from the viewpoint of achieving a coefficient of thermal expansion that is as close as possible to that of silicon, while also using a metal of high thermal resistance which is compatible with plating techniques, chromium (Cr) is the most desirable choice for the metal wiring 60.

Figure 8F:
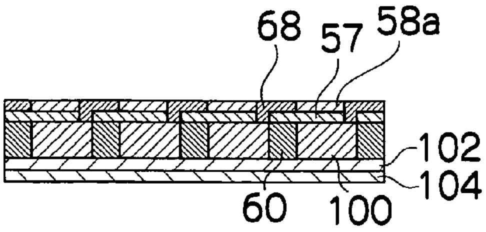

Thereupon, as shown in FIG. 8F, polyimide (PI) 68 is applied by spin coating or spray coating into the spaces created by removing the mask 114. Grinding is then performed using chemical mechanical polishing (CMP), for example, to achieve a flat surface.

Figure 8G:
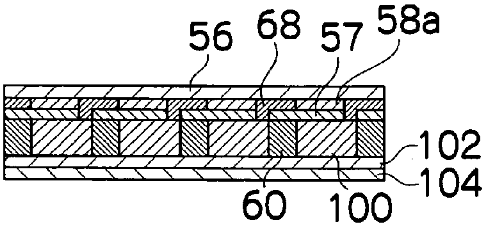

Next, as shown in FIG. 8G, Cr, or the like, is applied by sputtering onto the flattened surface, to a thickness of approximately 15 μm, thereby forming a diaphragm 56.

Figure 8H:
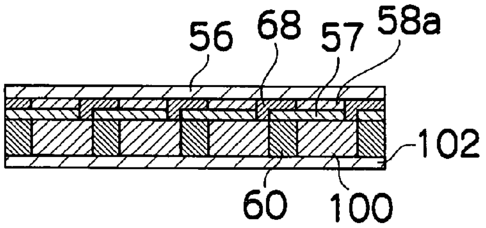

Thereupon, as shown in FIG. 8H, the lowermost $SiO_2$ film 104 is stripped away, in order that the piezoelectric bodies 58*a* can be poled (polarized) jointly. The piezoelectric bodies 58*a* are poled jointly by applying a high-voltage electric field of several tens kV/mm, for example, to the gold conductive film 102 which is connected to the respective individual electrodes 57 via the electrical wires 60, inside heated silicone oil, taking the diaphragm 56 as a ground connection.

Figure 8I:
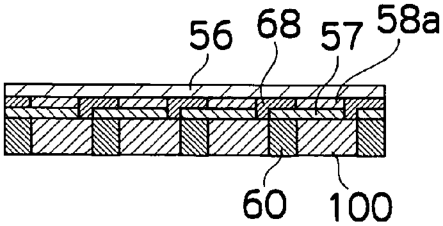

Next, as shown in FIG. 8I, the lowermost gold conductive film 102, which is now redundant, is stripped away by polishing using CMP, for instance. In this way, on the lower surface, both the sections which are to form the electrical wires 60 and the silicon substrate 100 become exposed.

Next, a process for manufacturing a print head 50 by bonding pressure chambers and an IC substrate formed by a conventional method onto the substrate formed by the processing up and including to the step in FIG. 8I, will be described with reference to FIGS. 9A to 9G.

Figure 9A:
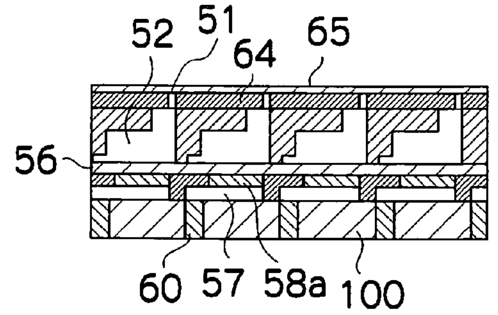
FIGS. 9A to 9G are process step diagrams showing a process for bonding pressure chambers with an IC substrate.

Firstly, as shown in FIG. 9A, pressure chambers 52 bonded to a nozzle plate 64 formed with nozzle holes 51 are bonded onto the substrate formed by the processing up to and including the step shown in FIG. 8I. The pressure chambers 52 are bonded to the diaphragm 56 on the substrate formed by the processing up to and including the step shown in FIG. 8I. In this case, the silicon substrate 100 still remains in the substrate on the side of the electrical wires 60, and this forms a pressure plate during bonding which makes it possible to ensure rigidity during bonding.

Furthermore, sections which are to form a portion of the supply channels are formed in the partitions of the pressure chambers 52 which are bonded to the diaphragm 56. Moreover, a dry film 65 forming a protective layer is applied to the surface of the nozzle plate 64 in order to protect the nozzle surface from the various processing steps which are carried out subsequently.

Figure 9E:
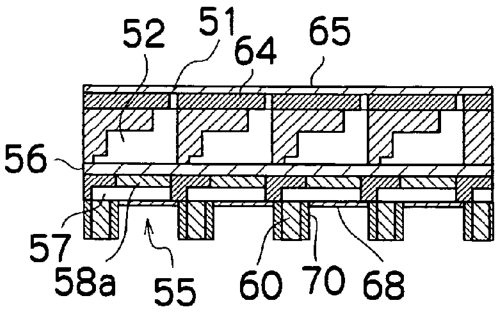
Figure 9B:
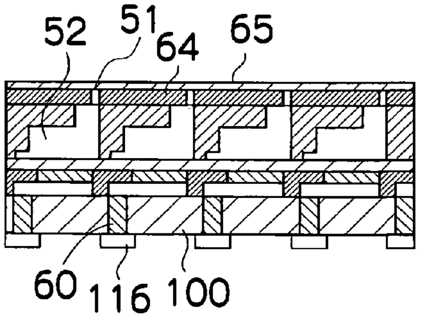

Thereupon, as shown in FIG. 9B, a mask 116 of $SiO_2$ film, or the like, for removing the unwanted silicon substrate 100 in order to create the electrical wires 60 and common liquid chamber 55 is formed by sputtering on the lower surface, using a pattern which is slightly larger than the sections corresponding to the electrical wires 60.

Figure 9F:
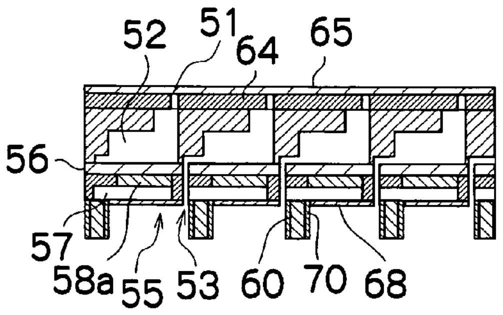
Figure 9C:
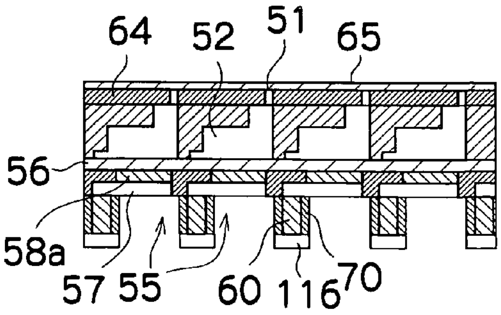

Next, as shown in FIG. 9C, anisotropic etching is performed from the lower side, thereby excavating the silicon substrate 100 until the platinum individual electrodes 57 appear. In this case, silicon is left remaining about the perimeter of the electrical wires 60 (electrical columns). The silicon left on the outer circumferences of the electrical wires 60 is used as an ink sealing material. Furthermore, the open sections created by this excavation step will eventually form the common liquid chamber 55. Alternatively, dry reactive ion-etching (D-RIE) using photoresist may be employed to cut away the silicon substrate 100 in this way.

Figure 9G:
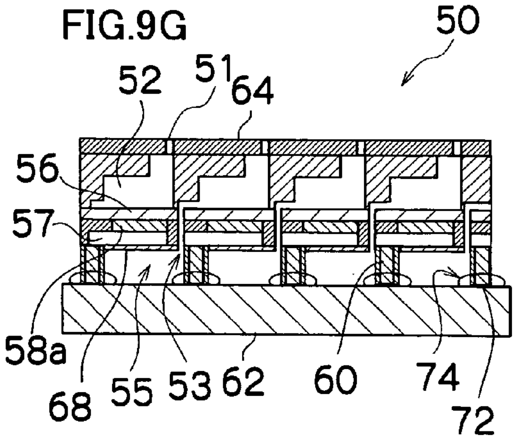
Figure 9D:
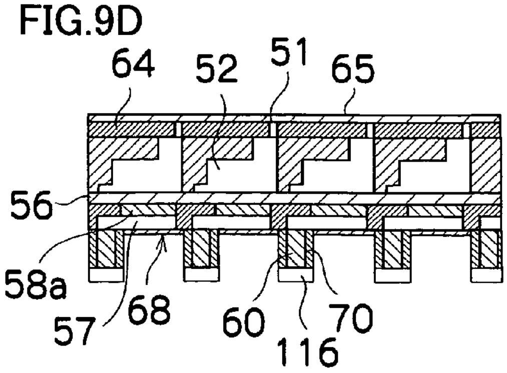

Thereupon, as shown in FIG. 9D, since ink will subsequently be filled into the section forming the common liquid chamber 55, then the individual electrodes 57 will make contact with the ink if they are stripped bare, and therefore, the individual electrodes 57 are insulated by coating polyimide (PI) 68 to a thickness of 2 μm to 3 μm thereon.

Next, as shown in FIG. 9E, the mask 116 made of a $SiO_2$ film attached to the bottommost layer is stripped away. As shown in FIG. 9F, holes are then opened by laser, or the like, in the layer of polyimide 68 and the chromium diaphragm 56, from the lower side, thereby forming supply ports 53 which connect the pressure chambers 52 with the common liquid chamber 55. Consequently, it is possible to connect the common liquid chamber 55 and the pressure chambers 52 directly.

Finally, as shown in FIG. 9G, a multi-layer flexible cable 62, which is an electrical installation substrate formed onto an IC, is bonded to this substrate. This bonding process is carried out by bonding the respective electrode connecting sections 72 of the multi-layer flexible cable 62 with the respective electrical wires 60, by means of an adhesive 74 containing an electrically conductive filler. This adhesive is, for example, an adhesive of epoxy mixed with conductive granules, and one known conductive granule of this kind is obtained by forming an Ni—Au field-free plating onto a polystyrene sphere, for example. Apart from this, it is also possible to use an anisotropic conductive film (ACF). In either case, a bond is created in which an electrical connection is only established in the direction of pressurization, and insulation is provided in all other directions.

By means of this bonding step, it is possible to create electrical connections and to provide sealing against the ink, simultaneously. In this way, a common liquid chamber 55 forming a large ink pool is created between the individual electrodes 57 and the multi-layer flexible cable 62, by means of the electrical wires 60. Furthermore, the dry film 65 forming a protective film which has been previously applied to the nozzle plate 64 is now removed.

In this way, a print head 50 is formed in which piezoelectric bodies 58*a* and a common liquid chamber 55 are formed on the opposite side of the diaphragm 56 with respect to the pressure chambers 52.

As described above, according to the method of manufacturing a print head according to the present embodiment, since the electrical wiring sections, the piezoelectric elements and the diaphragm are formed in a unified structure, it is possible to form the electrical wires (electrical columns) and the piezoelectric bodies on the same substrate, and therefore, positional divergence does not occur.

Furthermore, since the heat treatment process for the piezoelectric bodies is carried out after fabricating the electrical wires, and either during or after the piezoelectric body film formation process, and before formation of the diaphragm, then there is no occurrence of thermal warping in the diaphragm. Moreover, since poling (polarization) is carried out by using the wiring section (gold conductive film 102) employed in the manufacture of the diaphragm and the electrical wires, then all of the piezoelectric bodies can be poled (polarized) together, without providing separate drivers.

Furthermore, by forming holes (opening sections) which are to create the common liquid chamber by means of anisotropic etching of silicon or dry reactive ion etching (D-RIE), coating the electrical wiring sections with silicon, and also using silicon as the bonding substrate below the pressure chambers, it is possible to apply pressure when bonding the pressure chambers to the substrate in which the piezoelectric bodies are formed.

As stated previously, by coating the outer circumferences of the electrical wires (electrical columns) with silicon, it is possible to reinforce the electrical wires, as well as increasing ink resistance properties and insulating properties.

Furthermore, by providing a surface treatment of $SiO_2$ or the like on the silicon, it is possible further to improve the ink resistance properties and the insulating properties. Moreover, by providing columns of silicon (dummy silicon columns) in addition to the coating of silicon provided on the electrical wires (electrical columns), it is possible to improve the overall strength.

Figure 10:
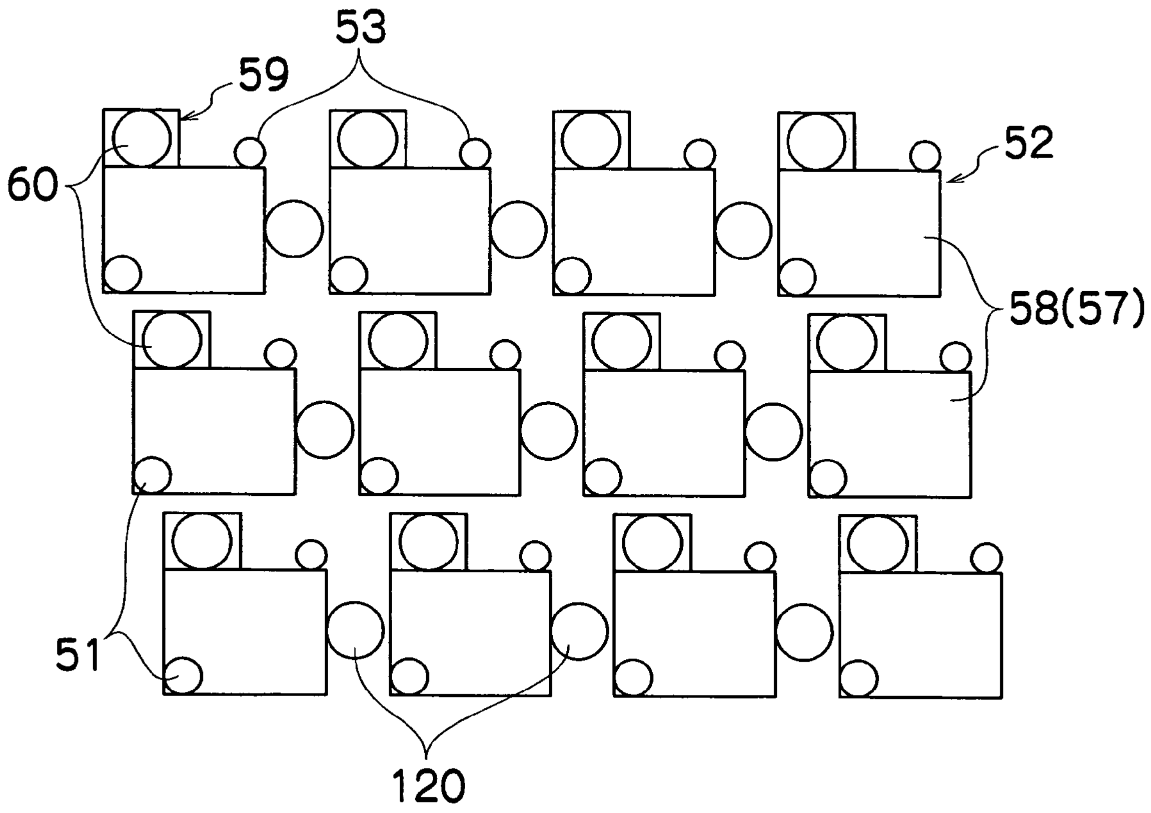
FIG. 10 is a plan diagram showing a state where silicon columns have been formed.

For example, as shown in plan view in FIG. 10, a nozzle 51, ink supply port 53 and piezoelectric element 58 (individual electrode 57) are formed respectively at each of the pressure chambers 52 arranged in a two-dimensional matrix array, and a column-shaped electrical wire (electrical column) 60 is formed on top of an electrode pad 59 extracted form each individual electrode 57. In this case, in addition to the electrical wires 60, it is also possible to form silicon columns 120 between the pressure chambers 52 (over the partitions between the pressure chambers), in such a manner that the strength of the head is raised.

Moreover, when forming the common liquid chamber by excavating the silicon, it is also possible to leave silicon in the portions other than the sections which are to form the common liquid chamber, in such a manner that a plurality of electrical wires (electrical columns) are formed inside a wall-shaped portion of remaining silicon, which does not necessarily have a column shape. By adopting this composition, it is possible to increase strength yet further.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for manufacturing a liquid ejection head comprising a diaphragm which serves as portions of pressure chambers connected to nozzles through which liquid is ejected, and piezoelectric bodies which deform the diaphragm, the method comprising:

an electrical wire forming step of removing at least a part of a silicon substrate, and forming electrical wires for supplying drive signals to drive the piezoelectric bodies, in sections where the silicon substrate has been removed;

a piezoelectric body forming step of forming the piezoelectric bodies on sections where the silicon substrate has not been removed at least in the electrical wire forming step;

a diaphragm forming step of forming the diaphragm on a side of the piezoelectric bodies opposite to the silicon substrate;

a pressure chamber bonding step of bonding a separately formed nozzle plate including the pressure chambers and the nozzles, onto the silicon substrate on which the electrical wires, the piezoelectric bodies and the diaphragm have been formed respectively in the electrical wire forming step, the piezoelectric body forming step and the diaphragm forming step; and a common liquid chamber forming step of, removing the silicon substrate between the electrical wires while leaving silicon covering outer circumferences of the electrical wires, to form opening sections serving as a common liquid chamber which supplies the liquid to the pressure chambers after the pressure chamber bonding step, wherein the electrical wires are formed perpendicularly to the silicon substrate in the electrical wire forming step.

2. The method as defined in claim 1, wherein the removing of the silicon substrate in the common liquid chamber forming step is performed by means of at least one of anisotropic etching and dry etching.

3. A method for manufacturing a liquid ejection head comprising a diaphragm which serves as portions of pressure chambers connected to nozzles through which liquid is ejected, and piezoelectric bodies which deform the diaphragm, the method comprising:

forming a plurality of holes in a silicon substrate;

filling the formed plurality of holes in the silicon substrate with conductive material to form a plurality of electrical wires;

forming electrodes to cover the formed electrical wires and at least a part of a surface area of the silicon substrate between the formed electrical wires;

forming the piezoelectric bodies on sections of the electrodes covering the at least a part of the surface area of the silicon substrate between the formed electrical wires so that the electrical wires and electrodes can supply drive signals to the piezoelectric bodies to drive the piezoelectric bodies; and forming the diaphragm on a side of the formed piezoelectric bodies away from the silicon substrate, wherein the forming of the plurality of holes in the silicon substrate is performed by means of at least one of anisotropic etching and dry etching, and the forming of the electrical wires is performed by plating.

4. The method as defined in claim 3, further comprising bonding a separately formed nozzle plate including the pressure chambers and the nozzles, onto the silicon substrate on which the electrical wires, the electrodes, the piezoelectric bodies, and the diaphragm have already been formed.

5. The method as defined in claim 3, further comprising performing heat treatment for the formed piezoelectric bodies before forming the diaphragm.

6. The method as defined in claim 3, further comprising polarizing the piezoelectric bodies by using the formed electrical wire, the formed electrode, and the formed diaphragm.

* * * * *